US010690273B2

(12) United States Patent
Vreugde

(10) Patent No.: US 10,690,273 B2
(45) Date of Patent: Jun. 23, 2020

(54) SPLIT NUT ARRANGEMENT

(71) Applicant: HAMILTON SUNDSTRAND CORPORATION, Charlotte, NC (US)

(72) Inventor: Robert Vreugde, El Lago, TX (US)

(73) Assignee: Hamilton Sundstrand Corporation, Charlotte, NC (US)

(*) Notice: Subject to any disclaimer, the term of this patent is extended or adjusted under 35 U.S.C. 154(b) by 264 days.

(21) Appl. No.: 15/660,518

(22) Filed: Jul. 26, 2017

(65) Prior Publication Data
US 2019/0032822 A1 Jan. 31, 2019

(51) Int. Cl.
F16L 21/06 (2006.01)
F16L 19/02 (2006.01)
F16L 17/04 (2006.01)
F16B 37/08 (2006.01)

(52) U.S. Cl.
CPC ........... *F16L 21/06* (2013.01); *F16L 19/0231* (2013.01); *F16B 37/0892* (2013.01); *F16L 17/04* (2013.01)

(58) Field of Classification Search
CPC . F16L 21/06; F16L 21/065; F16L 3/10; F16L 17/04; F16L 27/1133; F16L 19/0231; F16B 37/0892; F16B 37/08; H02G 3/0675
USPC ......... 285/419, 390, 388, 355, 373; 174/664
See application file for complete search history.

(56) References Cited

U.S. PATENT DOCUMENTS

| 625,448 | A | * | 5/1899 | Jaenichen | F16L 55/172 285/373 |
| 1,082,993 | A | * | 12/1913 | Beatie | F16L 19/0231 411/433 |
| 2,052,958 | A | * | 9/1936 | Webb | 285/419 |
| 4,078,470 | A | | 3/1978 | Zeranick, Jr. | |
| 4,556,352 | A | * | 12/1985 | Resnicow | F16B 21/16 411/433 |
| 5,406,032 | A | | 4/1995 | Clayton et al. | |
| 5,608,189 | A | * | 3/1997 | Winterhoff | H02G 3/0675 174/656 |
| 6,821,070 | B1 | | 11/2004 | Thompson | |
| 6,908,123 | B2 | * | 6/2005 | Le | 285/419 |
| 9,059,537 | B2 | | 6/2015 | Peuchet et al. | |
| 2002/0079697 | A1 | * | 6/2002 | Griffioen | F16L 41/023 285/419 |
| 2004/0177989 | A1 | * | 9/2004 | Nass | 174/655 |
| 2009/0025977 | A1 | * | 1/2009 | Anderson | H02G 3/0675 174/653 |

FOREIGN PATENT DOCUMENTS

EP 2650577 A2 * 10/2013 .......... F16B 37/0892
WO 2007024144 3/2007

* cited by examiner

Primary Examiner — Zachary T Dragicevich
Assistant Examiner — William S. Choi
(74) Attorney, Agent, or Firm — Snell & Wilmer L.L.P.

(57) ABSTRACT

A split nut arrangement is provided. The split nut arrangement may be coupled to a fluid line. The split nut arrangement may comprise a first nut half and a second nut half. The first nut half and the second nut half may each comprise one or more mating grooves. The mating grooves of the first nut half may be configured to interlock with the mating grooves of the second nut half to couple the first nut half to the second nut half.

13 Claims, 6 Drawing Sheets

SPLIT NUT ARRANGEMENT

FIELD

The present disclosure relates to mechanical coupling arrangements, and more specifically, to a split nut arrangement.

BACKGROUND

In typical fluid line assemblies, mechanical nuts may be used to couple together fluid lines or to couple fluid lines to fluid sources or outputs. The nuts are typically preassembled on the fluid line before the fluid line ends are flared. As such, bend radii in the fluid line may be limited to allow the preassembled nuts to slide on the fluid line to reach either fluid line end. Moreover, a minimum amount of length is typically left on each fluid line end to allow tube flaring tools to flare the fluid line ends without being obstructed by the preassembled nuts. When building fluid line assemblies in limited volumetric areas (e.g., in aerospace applications), tube bend radii and shapes may be hindered, thus resulting in longer tube lengths, larger tube bend radii, and less optimization of the fluid line assembly.

SUMMARY

In various embodiments, a split nut arrangement is disclosed. The split nut arrangement may comprise a first nut half and a second nut half coupled to the first nut half. The first nut half may have a first inner surface opposite a first outer surface and a first opening end opposite a first closing end, wherein the first inner surface comprises a first inner mating groove defining a first groove on the first inner surface, and the first outer surface comprises a first outer mating groove defining a second groove on the first outer surface. The second nut half may have a second inner surface opposite a second outer surface and a second opening end opposite a second closing end, wherein the second inner surface comprises a second inner mating groove defining a third groove on the second inner surface, and the second outer surface comprises a second outer mating groove defining a fourth groove on the second outer surface.

In various embodiments, the first nut half may be coupled to the second nut half by interlocking the first outer mating groove with the second inner mating groove and the first inner mating groove with the second outer mating groove. In response to the first nut half being coupled to the second nut half, the first outer surface and the second outer surface may be configured to align to form a hexagonal shape. The first closing end may comprise a first flange defining a first protrusion extending from the first inner surface. The second closing end may comprise a second flange defining a second protrusion extending from the second inner surface. The first inner surface may comprise a first threaded surface proximate the first opening end and the second inner surface comprises a second threaded surface proximate the second opening end. The first threaded surface and the second threaded surface may be configured to align in response to the first nut half being coupled to the second nut half. The first outer mating groove may comprise a first detent defining a first protrusion on the first outer mating groove, and wherein the second inner mating groove comprises a first recess configured to interface with the first detent. The second inner mating groove may comprise a second detent defining a second protrusion on the second inner mating groove, and wherein the first outer mating groove comprises a second recess configured to interface with the second detent. The second outer mating groove may comprise a third detent defining a third protrusion on the second outer mating groove, and wherein the first inner mating groove comprises a third recess configured to interface with the third detent. The first inner mating groove may comprise a fourth detent defining a fourth protrusion on the first inner mating groove, and wherein the second outer mating groove comprises a fourth recess configured to interface with the fourth detent.

In various embodiments, a fluid line assembly is disclosed. The fluid line assembly may comprise a fluid line and a split nut arrangement coupled to the fluid line. The split nut arrangement may comprise a first nut half having a first inner surface opposite a first outer surface and a first opening end opposite a first closing end, wherein the first inner surface is at least partially in contact with the fluid line, wherein the first inner surface comprises a first inner mating groove defining a first groove on the first inner surface, and the first outer surface comprises a first outer mating groove defining a second groove on the first outer surface; and a second nut half coupled to the first nut half and having a second inner surface opposite a second outer surface and a second opening end opposite a second closing end, wherein the second inner surface is at least partially in contact with the fluid line, wherein the second inner surface comprises a second inner mating groove defining a third groove on the second inner surface, and the second outer surface comprises a second outer mating groove defining a fourth groove on the second outer surface.

In various embodiments, the first nut half may be coupled to the second nut half by interlocking the first outer mating groove with the second inner mating groove and the first inner mating groove with the second outer mating groove. In response to the first nut half being coupled to the second nut half, the first outer surface and the second outer surface may be configured to align to form a hexagonal shape. The first closing end may comprise a first flange defining a first protrusion extending from the first inner surface, wherein the second closing end comprises a second flange defining a second protrusion extending from the second inner surface, and wherein the first flange and the second flange are configured to limit movement of the split nut arrangement on the fluid line. The first inner surface may comprise a first threaded surface proximate the first opening end and the second inner surface comprises a second threaded surface proximate the second opening end, and wherein the first threaded surface and the second threaded surface are configured to align in response to the first nut half being coupled to the second nut half. The first outer mating groove may comprise a first detent defining a first protrusion on the first outer mating groove and the second inner mating groove comprises a first recess configured to interface with the first detent, and wherein the second inner mating groove comprises a second detent defining a second protrusion on the second inner mating groove and the first outer mating groove comprises a second recess configured to interface with the second detent. The second outer mating groove may comprise a third detent defining a third protrusion on the second outer mating groove and the first inner mating groove comprises a third recess configured to interface with the third detent, and wherein the first inner mating groove comprises a fourth detent defining a fourth protrusion on the first inner mating groove and the second outer mating groove comprises a fourth recess configured to interface with the fourth detent.

In various embodiments, a method of installing a split nut arrangement is disclosed. The method may comprise placing a first nut half on to a fluid line, wherein the first nut half comprises a first outer surface having a first outer mating groove defining a first groove on the first outer surface, and a first inner surface having a first inner mating groove defining a second groove on the first inner surface; placing a second nut half on to the fluid line, wherein the second nut half comprises a second outer surface having a second outer mating groove defining a third groove on the second outer surface, and a second inner surface having a second inner mating groove defining a fourth groove on the second inner surface; and coupling the first nut half to the second nut half, wherein in response to being coupled the first nut half and the second nut half form an integral nut on the fluid line.

In various embodiments, the first nut half may be coupled to the second nut half by interlocking the first outer mating groove with the second inner mating groove, and the second outer mating groove with the first inner mating groove.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
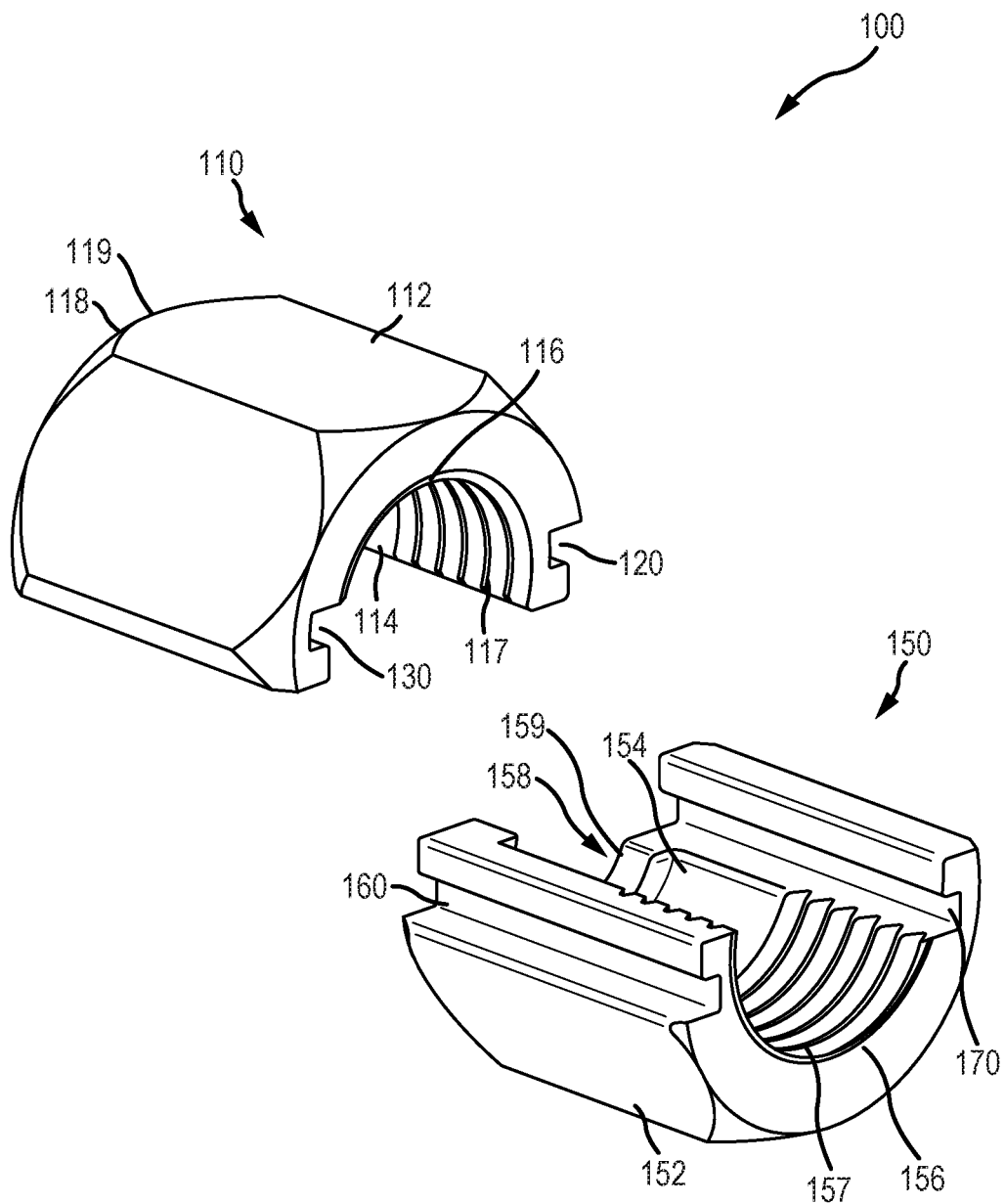
FIG. 1 illustrates a perspective view of a split nut arrangement, in accordance with various embodiments.

In various embodiments, and with reference to FIG. 1, a split nut arrangement 100 is disclosed. Split nut arrangement 100 may be configured to allow for the assembly of mechanical nuts after flaring, passivation, and the like of a fluid line. In that respect, split nut arrangement 100 may allow for the formation of smaller and more complex fluid line shapes. The formation of smaller and more complex fluid line shapes may at least partially increase utilization of fluid lines in limited volumetric areas (e.g., in aerospace applications).

In various embodiments, split nut arrangement 100 may comprise a first nut half 110 and a second nut half 150. First nut half 110 and second nut half 150 may be formed using any suitable process, such as, for example, machining, investment casting, and/or the like. First nut half 110 and second nut half 150 may be made by an additive manufacturing process, such as, for example, fused deposition modeling, polyjet 3D printing, electron-beam freeform fabrication, direct metal laser sintering, electron-beam melting, selective laser melting, selective laser sintering, multiphoton polymerization, digital light processing, and/or any other suitable additive manufacturing process. Additive manufacturing techniques may enable the formation of complex contours on first nut half 110 and/or second nut half 150 (e.g., a first threaded surface 117, a first outer mating groove 120, a first inner mating groove 130, a second threaded surface 157, a second outer mating groove 160, and/or a second inner mating groove 170).

In various embodiments, first nut half 110 may comprise a first outer surface 112 opposite a first inner surface 114. First outer surface 112 may comprise any suitable shape, such as, for example a half-hexagonal shape (e.g., split nut arrangement 100 may comprise a hexagonal shape in response to first nut half 110 being coupled to second nut half 150). First inner surface 114 may comprise any suitable size and shape. For example, first inner surface 114 may comprise a cylindrical shape and may be configured to engage a fluid line (e.g., fluid line 406, with brief reference to FIG. 4A). In various embodiments, first nut half 110 may comprise a first opening end 116 opposite a first closing end 118. First opening end 116 may be configured to engage a second closing end 158 of second nut half 150, as discussed further herein. First closing end 118 may comprise a first flange 119. First flange 119 may be located on first inner surface 114 and may define a protrusion extending radially inward from first inner surface 114 proximate first closing end 118. As discussed further herein, first flange 119 may be configured to at least partially limit movement of first nut half 110 in response to split nut arrangement 100 being coupled to a fluid line (e.g., fluid line 406, with brief reference to FIG. 4A).

In various embodiments, first nut half 110 may comprise a first threaded surface 117. For example, first threaded surface 117 may define a portion of first inner surface 114 proximate first opening end 116. First threaded surface 117 may align with second threaded surface 157 in response to first nut half 110 being coupled to second nut half 150, as discussed further herein. In that regard, first threaded surface 117 may be configured to allow split nut arrangement 100 to couple to an object, such as a second fluid line comprising a male threaded surface configured to interface with first threaded surface 117 (and second threaded surface 157, as discussed further herein).

In various embodiments, first nut half 110 may comprise a first outer mating groove 120 and a first inner mating groove 130. First outer mating groove 120 may be located on first outer surface 112 and may define a groove on first outer surface 112 extending from first opening end 116 to first closing end 118. First outer mating groove 120 may be configured to interface with second inner mating groove 170, as discussed further herein. In that respect, first outer mating groove 120 may comprise any suitable size and geometry to allow first outer mating groove 120 to interface with second inner mating groove 170. First inner mating groove 130 may be located on first inner surface 114 and may define a groove on first inner surface 114 extending from first opening end 116 to first closing end 118. First inner mating groove 130 may be configured to interface with second outer mating groove 160, as discussed further herein. In that respect, first inner mating groove 130 may comprise any suitable size and geometry to allow first inner mating groove 130 to interface with second outer mating groove 160.

In various embodiments, second nut half 150 may comprise a second outer surface 152 opposite a second inner surface 154. Second outer surface 152 may comprise any suitable shape, such as, for example a half-hexagonal shape (e.g., split nut arrangement 100 may comprise a hexagonal shape in response to first nut half 110 being coupled to second nut half 150). Second inner surface 154 may comprise any suitable size and shape. For example, second inner surface 154 may comprise a cylindrical shape and may be configured to engage a fluid line (e.g., fluid line 406, with brief reference to FIG. 4A). In various embodiments, second nut half 150 may comprise a second opening end 156 opposite a second closing end 158. Second closing end 158 may be configured to engage a first opening end 116 of first nut half 110, as discussed further herein. Second closing end 158 may comprise a second flange 159. Second flange 159 may be located on second inner surface 154 and may define a protrusion extending radially inward from second inner surface 154 proximate second closing end 158. As discussed further herein, second flange 159 may be configured to at least partially limit movement of second nut half 150 in response to split nut arrangement 100 being coupled to a fluid line (e.g., fluid line 406, with brief reference to FIG. 4A).

In various embodiments, second nut half 150 may comprise a second threaded surface 157. For example, second threaded surface 157 may define a portion of second inner surface 154 proximate second opening end 156. Second threaded surface 157 may be configured to align with first threaded surface 117 in response to first nut half 110 being coupled to second nut half 150. For example, grooves in second threaded surface 157 may align with grooves in first threaded surface 117 to form a continuous threaded surface. Second threaded surface 157 and first threaded surface 117 may collectively form a spiral-grooved configuration, and/or any other suitable threaded configuration. In that regard, second threaded surface 157 may be configured to allow split nut arrangement 100 to couple to an object, such as a second fluid line comprising a male threaded surface configured to interface with second threaded surface 157 (and first threaded surface 117, as discussed further herein).

In various embodiments, second nut half 150 may comprise a second outer mating groove 160 and a second inner mating groove 170. Second outer mating groove 160 may be located on second outer surface 152 and may define a groove on second outer surface 152 extending from second opening end 156 to second closing end 158. Second outer mating groove 160 may be configured to interface with first inner mating groove 130, as discussed further herein. In that respect, second outer mating groove 160 may comprise any suitable size and geometry to allow second outer mating groove 160 to interface with first inner mating groove 130. Second inner mating groove 170 may be located on second inner surface 154 and may define a groove on second inner surface 154 extending from second opening end 156 to second closing end 158. Second inner mating groove 170 may be configured to interface with first outer mating groove 120, as discussed further herein. In that respect, second inner mating groove 170 may comprise any suitable size and geometry to allow second inner mating groove 170 to interface with first outer mating groove 120.

Figure 2:
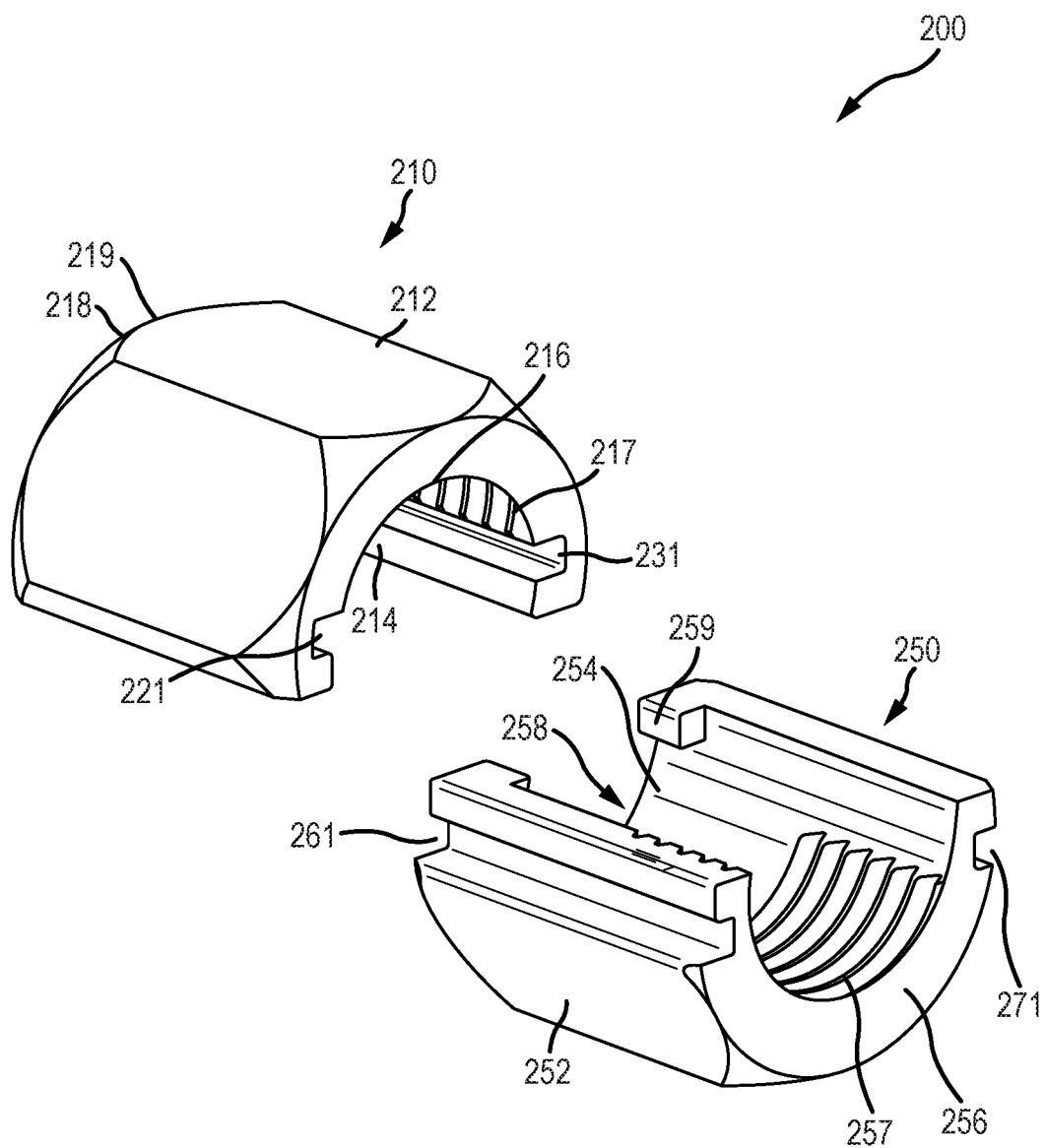
FIG. 2 illustrates a perspective view of a split nut arrangement having a first nut half with inner mating grooves and a second nut half with outer mating grooves, in accordance with various embodiments.

In various embodiments, and with reference to FIG. 2, a split nut arrangement 200 may also comprise a first nut half 210 and a second nut half 250 having any other suitable mating groove configurations. First nut half 210 may be similar to first nut half 110, with brief reference to FIG. 1. In that respect, first nut half 210 may comprise a first outer surface 212 opposite a first inner surface 214, and a first opening end 216 opposite a first closing end 218. A first flange 219 may be located on first inner surface 214 and may define a protrusion extending radially inward from first inner surface 214 proximate first closing end 218. First inner surface 214 may comprise a first threaded surface 217 defining a portion of first inner surface 214 proximate first opening end 216. First threaded surface 217 may be similar to first threaded surface 117, with brief reference to FIG. 1. First nut half 210 may comprise a third inner mating groove 221 and a fourth inner mating groove 231. Third inner mating groove 221 and fourth inner mating groove 231 may be similar to first inner mating groove 130, with brief reference to FIG. 1. Third inner mating groove 221 may be located on first inner surface 214 and may define a first groove on first inner surface 214 extending from first opening end 216 to first closing end 218. Third inner mating groove 221 may be configured to interface with third outer mating groove 261 in response to first nut half 210 being coupled to second nut half 250. Fourth inner mating groove 231 may be located on first inner surface 214 opposite third inner mating groove 221, and may define a second groove on first inner surface 214 extending from first opening end 216 to first closing end 218. Fourth inner mating groove 231 may be configured to interface with fourth outer mating groove 271 in response to first nut half 210 being coupled to second nut half 250.

Second nut half 250 may be similar to second nut half 150, with brief reference to FIG. 1. In that respect, second nut half 250 may comprise a second outer surface 252 opposite a second inner surface 254, and a second opening end 256 opposite a second closing end 258. Second flange 259 may be located on second inner surface 254 and may define a protrusion extending radially inward from second inner surface 254 proximate second closing end 258. Second inner surface 354 may comprise a second threaded surface 257 defining a portion of second inner surface 354 proximate second opening end 256. Second threaded surface 257 may be similar to second threaded surface 157, with brief reference to FIG. 1. Second nut half 250 may comprise a third outer mating groove 261 and a fourth outer mating groove 271. Third outer mating groove 261 and fourth outer mating groove 271 may be similar to second outer mating groove 160, with brief reference to FIG. 1. Third outer mating groove 261 may be located on second outer surface 252 and may define a first groove on second outer surface 252 extending from second opening end 256 to second closing end 258. Third outer mating groove 261 may be configured to interface with third inner mating groove 221 in response to first nut half 210 being coupled to second nut half 250. Fourth outer mating groove 271 may be located on second outer surface 252 opposite third outer mating groove 261, and may define a second groove on second outer surface 252 extending from second opening end 256 to second closing end 258. Fourth outer mating groove 271 may be configured to interface with fourth inner mating groove 231 in response to first nut half 210 being coupled to second nut half 250.

Figure 3:
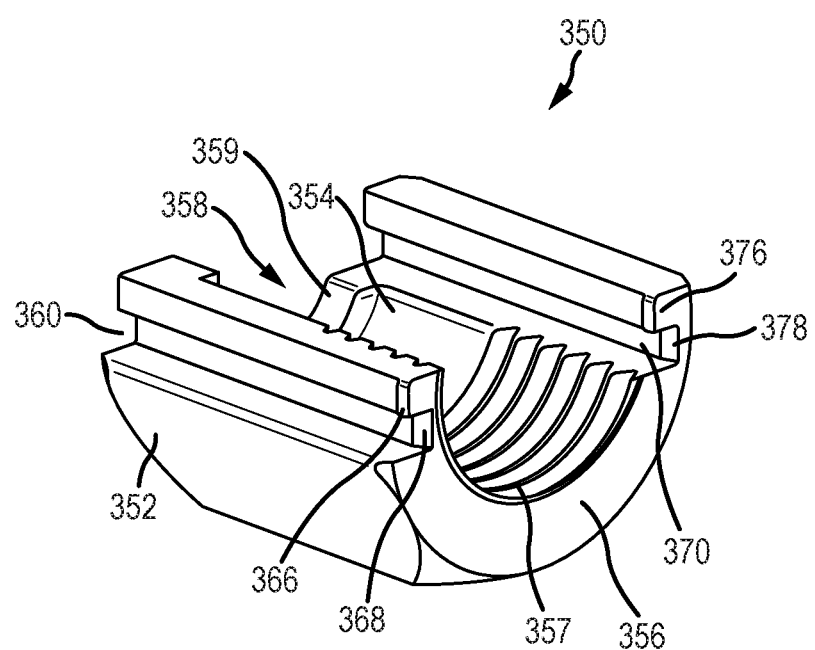
FIG. 3 illustrates a perspective view of a split nut arrangement having a mating groove locking feature, in accordance with various embodiments.

With reference again to FIG. 1, and in accordance with various embodiments, split nut arrangement 100 may further comprise locking features configured to retain first nut half 110 and second nut half 150 in response to first nut half 110 engaging second nut half 150. For example, and with reference to FIG. 3, a second nut half 350 is depicted including various locking features. Second nut half 350 may be similar to second nut half 150, with brief reference to FIG. 1. In that respect, second nut half 350 may comprise a second outer surface 352 opposite a second inner surface 354, and a second opening end 356 opposite a second closing end 358. Second flange 359 may be located on second inner surface 354 and may define a protrusion extending radially inward from second inner surface 354 proximate second closing 358. Second inner surface 354 may comprise a second threaded surface 357 defining a portion of second inner surface 354 proximate second opening end 356. Second threaded surface 357 may be similar to second threaded surface 157, with brief reference to FIG. 1

Second nut half 350 may comprise a second outer mating groove 360 and a second inner mating groove 370. Second outer mating groove 360 may be similar to second outer mating groove 160 and second inner mating groove 370 may be similar to second inner mating groove 170, with brief reference to FIG. 1. Second outer mating groove 360 may be located on second outer surface 352 and may define a groove on second outer surface 352 extending from second opening end 356 to second closing end 358. Second outer mating groove 360 may comprise various locking features, such as, for example, an outer mating groove detent 366 and an outer mating groove recess 368. Outer mating groove detent 366 may define a protrusion on second outer mating groove 360 proximate second opening end 356. Outer mating groove recess 368 may define a recess on second outer mating groove 360 proximate second opening end 356 and outer mating groove detent 366. Outer mating groove detent 366 may be configured to interface with a first nut half inner mating groove recess and outer mating groove recess 368 may be configured to interface with a first nut half inner mating groove detent in response to second nut half 350 being coupled to a first nut half (e.g., first nut half 110, with brief reference to FIG. 1). In that respect, the interfacing between each detent (e.g., outer mating groove detent 366) and recess (e.g., outer mating groove recess 368) may lock and retain second nut half 350 and the first nut half together.

Second inner mating groove 370 may be located on second inner surface 354 and may define a groove on second inner surface 354 extending from second opening end 356 to second closing end 358. Second inner mating groove 370 may comprise various locking features, such as, for example, an inner mating groove detent 376 and an inner mating groove recess 378. Inner mating groove detent 376 may define a protrusion on second inner mating groove 370 proximate second opening end 356. Inner mating groove recess 378 may define a recess on second inner mating groove 370 proximate second opening end 356 and inner mating groove detent 376. Inner mating groove detent 376 may be configured to interface with a first nut half outer mating groove recess and inner mating groove recess 378 may be configured to interface with a first nut half outer mating groove detent in response to second nut half 350 being coupled to a first nut half (e.g., first nut half 110, with brief reference to FIG. 1). In that respect, the interfacing between each detent (e.g., inner mating groove detent 376) and recess (e.g., inner mating groove recess 378) may lock and retain second nut half 350 and the first nut half together.

Figure 4A:
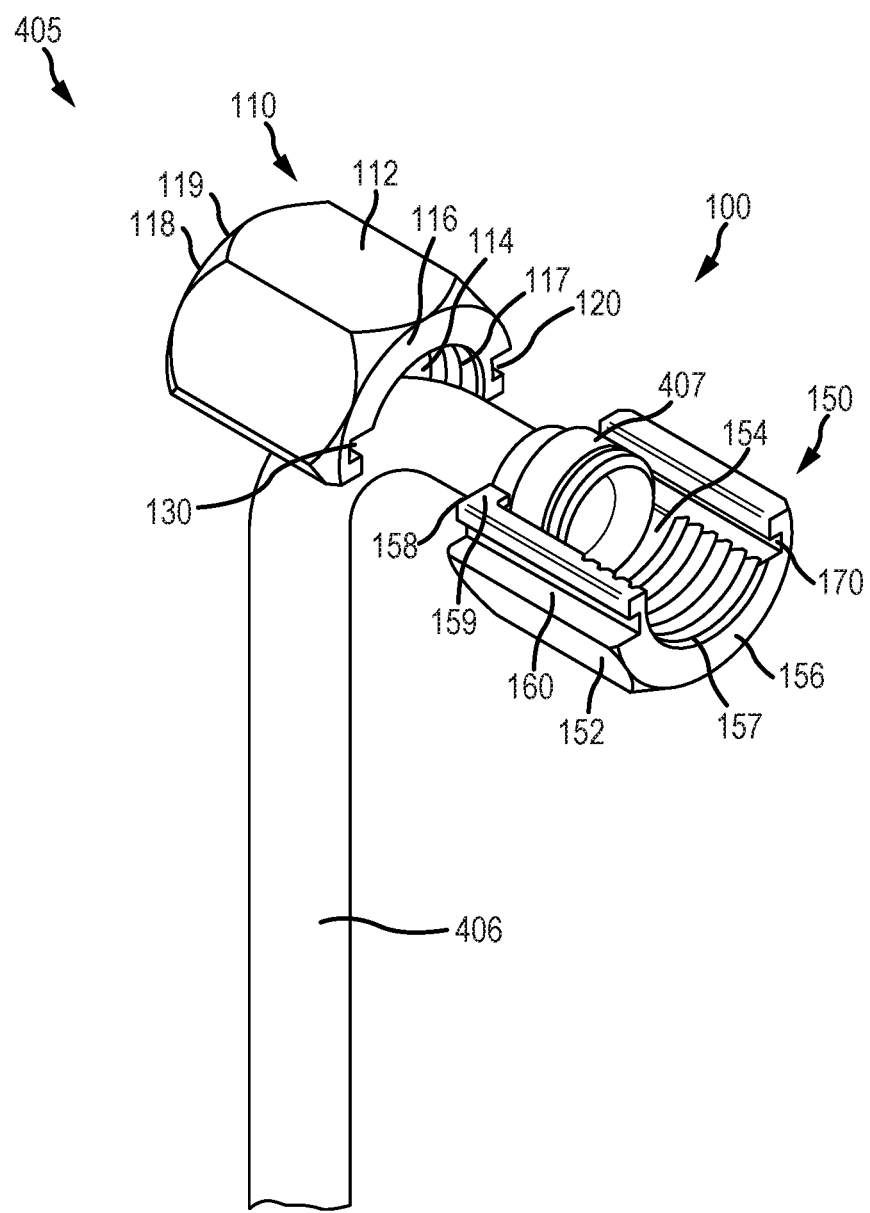
FIG. 4A illustrates a perspective view of a split nut arrangement engaging a fluid line, in accordance with various embodiments.
Figure 4B:
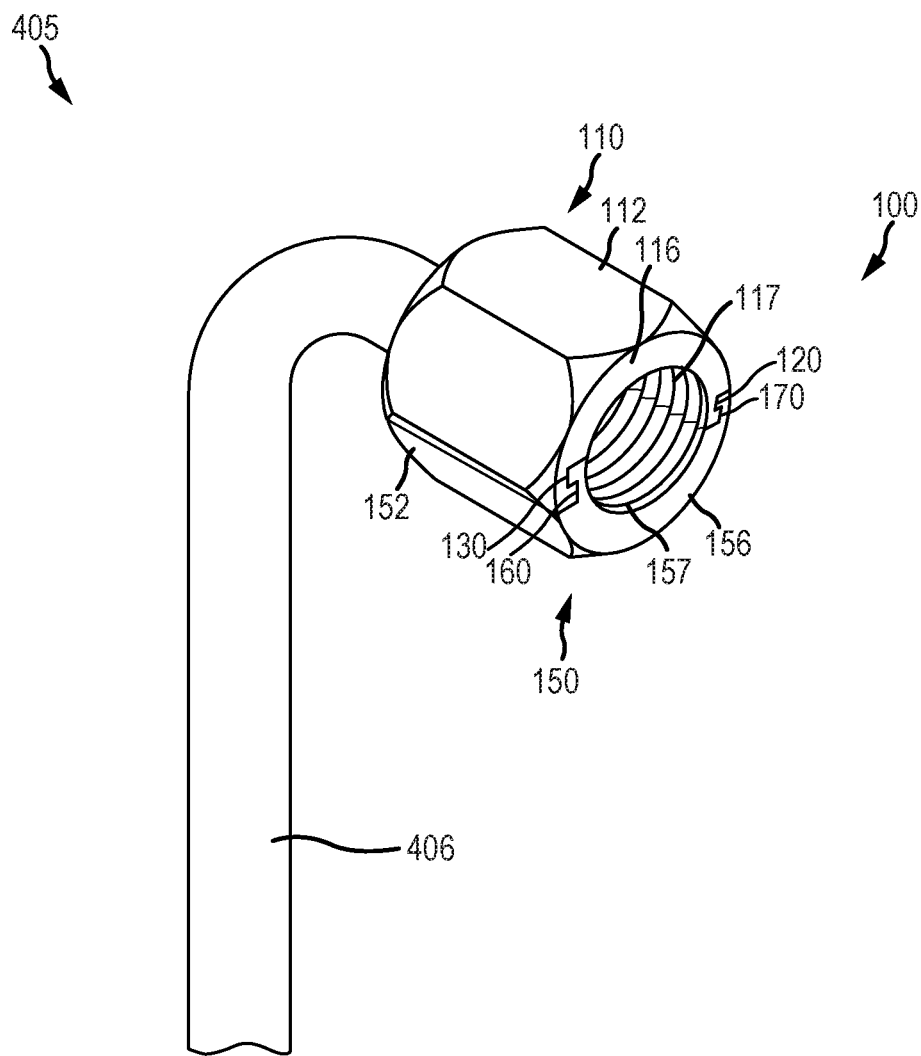
FIG. 4B illustrates a perspective view of a split nut arrangement coupled to a fluid line, in accordance with various embodiments.
Figure 5:
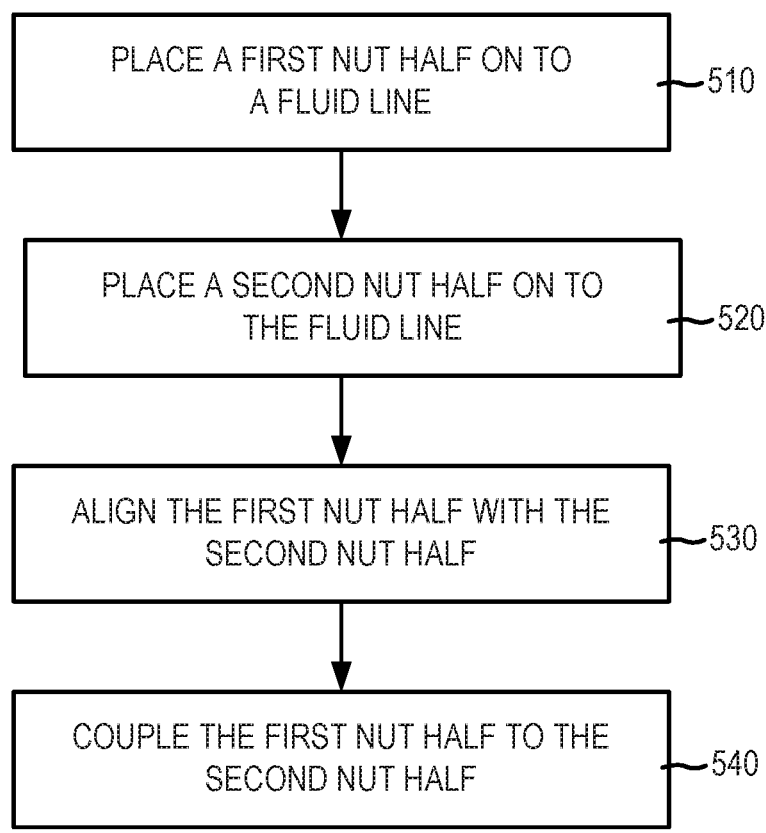
FIG. 5 illustrates a process flow for a method of installing a split nut arrangement, in accordance with various embodiments.

In various embodiments, and with reference to FIGS. 4A, 4B, and 5, a method 501 for installing a split nut arrangement 100 is disclosed. Split nut arrangement 100 may be installed on any suitable component, such as, for example a fluid line 406. In that respect, split nut arrangement 100 may be installed as part of a fluid line assembly 405. Fluid line assembly 405 may comprise fluid line 406 and split nut arrangement 100. Fluid line 406 may comprise a cylindrical pipe or the like, and may comprise a flared end 407.

In various embodiments, method 501 may comprise placing first nut half 110 on fluid line 406 (step 510). First nut half 110 may be placed on to fluid line 406 such that first inner surface 114 at least partially contacts fluid line 406. Method 501 may comprise placing second nut half 150 on fluid line 406 (step 520). Second nut half 150 may be placed on to fluid line 406 such that second inner surface 154 at least partially contacts fluid line 406. Method 501 may comprise aligning first nut half 110 with second nut half 150 (step 530). First nut half 110 may be aligned with second nut half 150 such that the mating grooves of each nut half at least partially align. For example, first outer mating groove 120 may be at least partially aligned with second inner mating groove 170 and first inner mating groove 130 may be at least partially aligned with second outer mating groove 160. Method 501 may comprise coupling first nut half 110 to second nut half 150 (step 540). For example, first nut half 110 may be coupled to second nut half 150 by interlocking the respective mating grooves. For example, first outer mating groove 120 may be interlocked with second inner mating groove 170 and first inner mating groove 130 may be interlocked with second outer mating groove 160. In the interlocked position, first nut half 110 and second nut half 150 may form an integral nut on fluid line 406, and may be configured to couple to a threaded object, as discussed further herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A split nut arrangement, comprising:
a first nut half having a first inner surface opposite a first outer surface and a first opening end opposite a first closing end, wherein the first inner surface comprises a first inner mating groove defining a first groove on the first inner surface extending from the first opening end to the first closing end, and the first outer surface comprises a first outer mating groove defining a second groove on the first outer surface extending from the first opening end to the first closing end; and
a second nut half coupled to the first nut half and having a second inner surface opposite a second outer surface and a second opening end opposite a second closing end, wherein the second inner surface comprises a second inner mating groove defining a third groove on the second inner surface extending from the second opening end to the second closing end, and the second outer surface comprises a second outer mating groove defining a fourth groove on the second outer surface and extending from the second opening end to the second closing end,
wherein the first nut half is coupled to the second nut half by interlocking the first outer mating groove with the second inner mating groove and the first inner mating groove with the second outer mating groove,
wherein the first outer mating groove is configured to slide axially into the second inner mating groove and the first inner mating groove is configured to slide axially into the second outer mating groove, and
wherein the first outer mating groove comprises a first detent defining a third protrusion on the first outer mating groove disposed at the first opening end, and wherein the first detent is configured to engage a first recess of the second inner mating groove.

2. The split nut arrangement of claim 1, wherein in response to the first nut half being coupled to the second nut half, the first outer surface and the second outer surface are configured to align to form a hexagonal shape.

3. The split nut arrangement of claim 1, wherein the first closing end comprises a first flange defining a first protrusion extending from the first inner surface.

4. The split nut arrangement of claim 1, wherein the second closing end comprises a second flange defining a second protrusion extending from the second inner surface.

5. The split nut arrangement of claim 1, wherein the first inner surface comprises a first threaded surface proximate the first opening end and the second inner surface comprises a second threaded surface proximate the second opening end.

6. The split nut arrangement of claim 5, wherein the first threaded surface and the second threaded surface are configured to align in response to the first nut half being coupled to the second nut half.

7. The split nut arrangement of claim 1, wherein the first inner mating groove comprises a second detent defining a second protrusion on the first inner mating groove, and wherein the second detent is configured to engage a second recess of the second outer mating groove.

8. The split nut arrangement of claim 7, wherein the first outer mating groove comprises a third recess disposed at the first opening end, and wherein the third recess is configured to engage a third detent of the second inner mating groove.

9. The split nut arrangement of claim 8, wherein the first inner mating groove comprises a fourth recess disposed at the first opening end, and wherein the fourth recess is configured to engage a fourth detent of the second outer mating groove.

10. A fluid line assembly, comprising:
a fluid line comprising a flared end; and
a split nut arrangement coupled to the fluid line, the split nut arrangement comprising:
a first nut half having a first inner surface opposite a first outer surface and a first opening end opposite a first closing end, wherein the first inner surface is at least partially in contact with the fluid line, wherein the first inner surface comprises a first inner mating groove defining a first groove on the first inner surface extending from the first opening end to the first closing end, and the first outer surface comprises a first outer mating groove defining a second groove on the first outer surface extending from the first opening end to the first closing end; and a second nut half coupled to the first nut half and having a second inner surface opposite a second outer surface and a second opening end opposite a second closing end, wherein the second inner surface is at least partially in contact with the fluid line, wherein the second inner surface comprises a second inner mating groove defining a third groove on the second inner surface extending from the second opening end to the second closing end, and the second outer surface comprises a second outer mating groove defining a fourth groove on the second outer surface extending from the second opening end to the second closing end, wherein the first nut half is coupled to the second nut half by interlocking the first outer mating groove with the second inner mating groove and the first inner mating groove with the second outer mating groove, wherein the first outer mating groove is configured to slide axially into the second inner mating groove and the first inner mating groove is configured to slide axially into the second outer mating groove, wherein the first closing end comprises a first flange defining a first protrusion extending from the first inner surface, wherein the second closing end comprises a second flange defining a second protrusion extending from the second inner surface, and wherein the first flange and the second flange are configured to abut the flared end, and wherein the first outer mating groove comprises a first detent defining a third protrusion on the first outer mating groove disposed at the first opening end, wherein the first detent is configured to engage a first recess of the second inner mating groove, wherein the first inner mating groove comprises a second detent defining a fourth protrusion on the first inner mating groove disposed at the first opening end, and wherein the second detent is configured to engage a second recess of the second outer mating groove.

11. The fluid line assembly of claim 10, wherein in response to the first nut half being coupled to the second nut half, the first outer surface and the second outer surface are configured to align to form a hexagonal shape.

12. The fluid line assembly of claim 10, wherein the first inner surface comprises a first threaded surface proximate the first opening end and the second inner surface comprises a second threaded surface proximate the second opening end, and wherein the first threaded surface and the second threaded surface are configured to align in response to the first nut half being coupled to the second nut half.

13. The fluid line assembly of claim 10, wherein the first outer mating groove comprises a third recess disposed at the first opening end, wherein the third recess is configured to engage a third detent of the second inner mating groove, wherein the first inner mating groove comprises a fourth recess configured to disposed at the first opening end, and wherein the fourth recess is configured to engage a fourth detent of the second outer mating groove.

* * * * *